(12) United States Patent
Xu et al.

(10) Patent No.: US 12,154,265 B2
(45) Date of Patent: Nov. 26, 2024

(54) MODEL ISOMORPHISM DETECTION

(71) Applicant: AURA Technologies, LLC, Chapel Hill, NC (US)

(72) Inventors: Ziye Xu, Raleigh, NC (US); Eric Strong, Orono, ME (US); Alex Blate, Chapel Hill, NC (US); Douglas Bennett, Chapel Hill, NC (US)

(73) Assignee: AURA Technologies, LLC, Carrboro, NC (US)

( * ) Notice: Subject to any disclaimer, the term of this patent is extended or adjusted under 35 U.S.C. 154(b) by 0 days.

(21) Appl. No.: 18/420,191

(22) Filed: Jan. 23, 2024

(65) Prior Publication Data

US 2024/0249403 A1 Jul. 25, 2024

Related U.S. Application Data

(60) Provisional application No. 63/481,058, filed on Jan. 23, 2023.

(51) Int. Cl.
*G06T 7/00* (2017.01)
*G06T 7/64* (2017.01)

(52) U.S. Cl.
CPC ............... *G06T 7/001* (2013.01); *G06T 7/64* (2017.01); *G06T 2207/30108* (2013.01)

(58) Field of Classification Search
CPC .. G06T 7/001; G06T 7/64; G06T 2207/30108
See application file for complete search history.

(56) References Cited

U.S. PATENT DOCUMENTS

| | | | |
|---|---|---|---|
| 9,529,826 B2 | 12/2016 | Harp et al. | |
| 10,656,624 B2 | 5/2020 | Whitmarsh et al. | |
| 2003/0135846 A1* | 7/2003 | Jayaram | G06F 30/00 717/137 |
| 2013/0174129 A1* | 7/2013 | Grammel | G06F 16/212 707/E17.069 |

FOREIGN PATENT DOCUMENTS

CN 112100417 A 12/2020

* cited by examiner

*Primary Examiner* — Jeffery A Brier
(74) *Attorney, Agent, or Firm* — Danielson Legal LLC

(57) ABSTRACT

Systems and methods for identifying similar three-dimensional (3D) representations of an object. The method includes receiving at an interface a target 3D model and at least one candidate 3D model, executing at least one feature identification procedure to identify a feature of the target 3D model, generating a target feature tensor based on the identified feature of the target 3D model, and executing the at least one feature identification procedure on the candidate 3D model. The method further includes generating a candidate feature tensor based on the identified feature of the candidate 3D model, executing at least one comparison function to compare the target feature tensor and the candidate feature tensor, generating a feature comparison tensor based on the execution of the at least one comparison function, and identifying a degree of similarity between target 3D model and the candidate 3D model based on the feature comparison tensor.

30 Claims, 4 Drawing Sheets

MODEL ISOMORPHISM DETECTION

CROSS REFERENCE TO RELATED APPLICATIONS

The present application claims the benefit of and priority to U.S. provisional application No. 63/481,058, filed on Jan. 23, 2023, the content of which is hereby incorporated by reference as if set forth in its entirety herein.

TECHNICAL FIELD

Embodiments described herein generally relate to systems and methods for analyzing representations of objects and, more particularly not exclusively, to systems and methods for detecting whether representations of objects are at least partially isomorphic.

BACKGROUND

Computer-aided design (CAD) techniques or programs are commonly used in a variety of applications for generating three-dimensional (3D) representations of objects. A 3D model may be a digital representation or encoding of a 3D object or a mathematical representation of the same. For example, a 3D model may be considered as a set of points or vertices in 3D space, and a set of edges that connect pairs of vertices. These edges may include line segments, arcs, parametric curves, or segments of circles, ellipses, or paraboloids.

3D models may originate from diverse sources and may be presented in a variety of different representations. In some applications, it may be desirable to determine whether two models represent the same or similar objects. Although this is generally easy for a human to do (e.g., by reviewing and comparing two models), it is difficult to perform automatically.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for identifying similar three-dimensional (3D) representations of an object. The method includes receiving at an interface a target 3D model and at least one candidate 3D model; executing at least one feature identification procedure to identify a feature of the target 3D model; generating a target feature tensor based on the identified feature of the target 3D model; executing the at least one feature identification procedure on the candidate 3D model; generating a candidate feature tensor based on the identified feature of the candidate 3D model; executing at least one comparison function to compare the target feature tensor and the candidate feature tensor; generating a feature comparison tensor based on the execution of the at least one comparison function; and identifying a degree of similarity between the target 3D model and the candidate 3D model based on the feature comparison tensor.

In some embodiments, identifying the degree of similarity between the target feature tensor and the candidate feature tensor includes providing an explanation of a result of the comparison function.

In some embodiments, the comparison function comprises one or more of an L1 norm, L2 norm, Hamming distance, Cartesian distance, cosine similarity, graph isomorphism, or tensor-component-wise difference.

In some embodiments, the at least one feature identification procedure applied to the target 3D model is identified according to at least one feature identified in a candidate model or another property of the candidate model.

In some embodiments, at least one of the target 3D model and the candidate 3D model is associated with metadata including a textual description, technical data files, user inputs, a stock keeping unit (SKU), or material specification, wherein the metadata is provided as an input to at least one of the feature identification procedure or the at least one comparison function.

In some embodiments, the at least one comparison function is configured to treat as identical at least one feature of the target 3D model if it differs from at least one feature of the candidate 3D model by at most a specified tolerance.

In some embodiments, the method further includes executing at least one classifier on the target 3D model to identify at least one classification of the target 3D model. In some embodiments, the method further includes selecting the at least one candidate 3D model from a corpus of stored 3D models based on the selected candidate 3D model having at least one classification matching at least one classification of the target 3D model. In some embodiments, the at least one classification is associated with at least one feature, and the at least one classification is determined according to the target 3D model having the at least one feature. In some embodiments, the method further includes selecting the at least one feature identification procedure based on the classification.

According to another aspect, embodiments relate to a system for identifying similar three-dimensional (3D) representations of an object. The system includes an interface for receiving a target 3D model and at least one candidate 3D model; and a processor executing instructions stored on memory and configured to execute at least one feature identification procedure to identify a feature of the target 3D model, generate a target feature tensor based on the identified feature of the target 3D model, execute the at least one feature identification procedure on the candidate 3D model, generate a candidate feature tensor based on the identified feature of the candidate 3D model, execute at least one comparison function to compare the target feature tensor and the candidate feature tensor, generate a feature comparison tensor based on the execution of the at least one comparison function, and identify a degree of similarity between target 3D model and the candidate 3D model based on the feature comparison tensor.

In some embodiments, the processor is further configured to provide an explanation of a result of the comparison function.

In some embodiments, the comparison function comprises one or more of L1 norm, L2 norm, Hamming distance, Cartesian distance, cosine similarity, graph isomorphism, or tensor-component-wise difference.

In some embodiments, the at least one feature identification procedure applied to the target 3D model is identified according to at least one feature identified in a candidate model or another property of the candidate model.

In some embodiments, at least one of the target 3D model and the candidate 3D model is associated with metadata including a textual description, technical data files, user inputs, a stock keeping unit (SKU), or material specification, wherein the metadata is provided as an input to at least one of the feature identification procedure or the at least one comparison function.

In some embodiments, the at least one comparison function is configured to treat as identical at least one feature of the target 3D model if it differs from at least one feature of the candidate 3D model by at most a specified tolerance.

In some embodiments, the processor is further configured to execute a classifier on the target 3D model to identify at least one classification of the target 3D model. In some embodiments, the processor is further configured to select the at least one candidate 3D model from a corpus of stored 3D models based on the selected candidate 3D model having at least one classification matching at least one classification of the target 3D model. In some embodiments, the at least one classification is associated with at least one feature, and the at least one classification is determined according to the target 3D model having the at least one feature. In some embodiments, the processor is further configured to select the at least one feature identification procedure based on the classification.

According to yet another aspect, embodiments relate to a method for determining a difference between two 3D models, the method comprising receiving at an interface a first 3D model and a second 3D model, executing a first feature identification procedure to identify at least a first feature of the first 3D model, generating a first feature tensor based on at least the first feature of the first 3D model, executing the first feature identification procedure to identify the at least the first feature of the second 3D model, generating a second feature tensor based on at least the first feature of the second 3D model, executing at least one comparison function to compare the first feature tensor and the second feature tensor, generating a feature comparison tensor based on the execution of the at least one comparison function, and identifying a difference between the first 3D model and the second 3D model based on the feature comparison tensor.

In some embodiments, the identified difference includes an explanation of the difference.

In some embodiments, the identified difference includes a reference to a location in at least one of the first 3D model and second 3D model where the identified difference is present.

In some embodiments, the at least one comparison function identifies that the identified difference is due to disparate discretization of curves or discretization of parametric curves.

In some embodiments the second 3D model is generated by converting the first 3D model into a different format than the first 3D model, and the identified differences are used to assess at least fidelity or accuracy of the second 3D model compared to the first 3D model.

In some embodiments, the second 3D model is a putative copy or updated version of the first 3D model, and the identified difference is used to determine whether the first 3D model is isomorphic with the second 3D model or whether the identified difference is due to tampering, sabotage, file corruption, or an unauthorized or unanticipated modification of the first model.

In some embodiments, the comparison function treats as equal a portion of the first 3D model and the second 3D model that represent identical geometries or real-world objects but may differ in respective encodings, 3D model or mesh formats or implementations, triangulation or polygonization density or degree, curve parameterization, coordinate system, orientation, or certain metadata.

In some embodiments, the at least one feature identification procedure is selected based on at least one of user input; metadata of the first 3D model or the second 3D model; cached or persisted calculations from previous operations on the first 3D model or the second 3D model; or heuristics, documents, files, or technical data associated with the first 3D model or the second 3D model.

In some embodiments, the at least one comparison function comprises calculating graph isomorphism between the first 3D model and the second 3D model using at least one identified feature that is common to the first 3D model and the second 3D model.

In some embodiments, the method further includes receiving a user selection of at least one element of the feature comparison tensor indicating a difference between the first 3D model and the second 3D model, and modifying at least one of the first 3D model and the second 3D model to remedy the identified difference.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
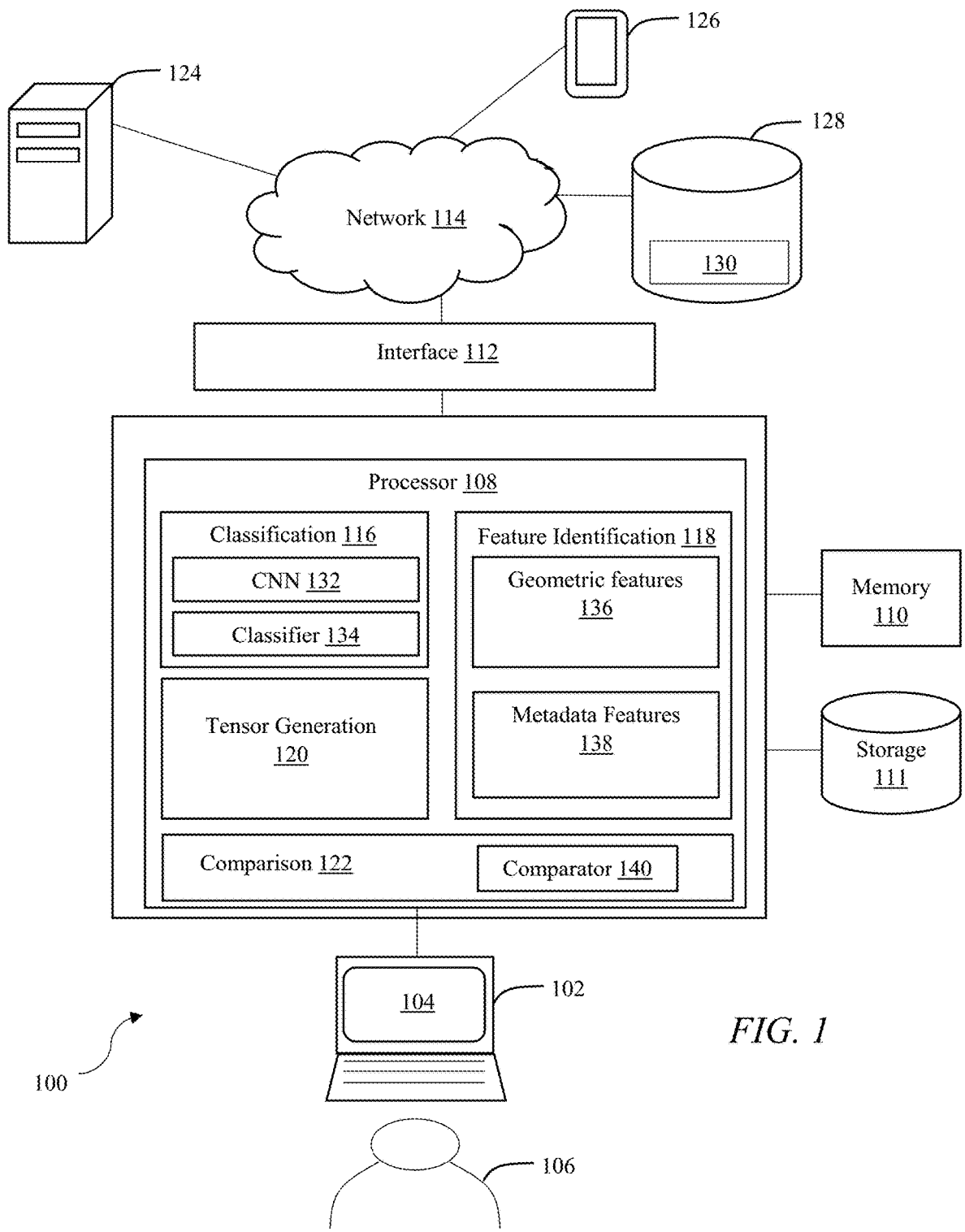
FIG. 1 illustrates a system for identifying similar 3D representations of an object in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

It may be desirable to determine whether two models are isomorphic (i.e., whether they represent the same object), or partially isomorphic (i.e., they represent similar objects). The disclosed embodiments provide systems and methods for identifying a model from a set of 3D models that is identical to or within a specified error tolerance of a target 3D model.

In some embodiments, such identification comprises a first, classifier stage followed by an analytical and semantic geometrical comparison stage. In some embodiments, the second stage comprises the computation and comparison of feature tensors corresponding to the analyzed models. In some embodiments, the analysis of the second stage is configured according to categorization or classification information of the first stage. As described herein, a comparison function may be referred to as a "comparator."

The features of the present application may be used for identifying assembly parts, for example. Many features of mechanical parts are standardized by standards bodies or similar entities, such as the International Organization for Standardization (ISO) and the American Society of Mechanical Engineers (ASME). These standards frequently comprise precise mathematical and geometric specifications of features.

Tradesmen frequently refer to reference materials, such as the *Machinery's Handbook* (Oberg et al, 1988, Industrial Press) when designing, fabricating, or inspecting parts. One of ordinary skill in the art, for example, if given a shaft having a feature comprising a machine taper, may take several measurements of the taper and refer to such reference materials to determine the specific type of machine taper or that the taper does not conform to a standard. Many other mechanical or geometric features specific to certain application domains are likewise standardized. Some embodiments of feature extraction algorithms or comparators may use a similar approach, i.e., analyzing models' geometries in the semantic context of the objects they represent.

The designs of certain parts, such as those comprising folded or stamped sheet metal or legacy mechanical drawings, may comprise 2D models or drawings (of 3D objects) and equivalent 3D models can be calculated from said 2D models. In some embodiments, a target may comprise a 3D model extracted from or calculated according to one or more 2D models or drawings. For simplicity, the present application describes the embodiments in the context of analyzing 3D models.

Distinct instances of 3D models of the same object may differ due to factors such as differences in floating point precision, implementation details of modeling or CAD software, conversions between 3D model formats or digital representations of 3D models, conversion between parametric curves and piecewise-linear approximations of curves, sampling resolution or noise, measurement tolerances, scale or unit conversions, or other incidental or systemic sources of error or deviation. In many applications, such errors may be below the practical or desirable tolerances for the respective object. For example, the precision of a 3D model of a manufacturable part may exceed that of the requisite manufacturing tolerances of the part or may exceed the precision or repeatability of a given manufacturing process. As an example, if two 3D models of a part differ by at most 0.0005 inches, the models may be deemed isomorphic in the context of a manufacturing process having a precision of 0.002 inches or may be deemed isomorphic in the context of a specification that the manufactured part's smallest tolerance is 0.001 inch.

The disclosed embodiments may be configured such that the margin of error or tolerance may be configured differently for different semantic features or according to scale. For example, the embodiments herein may be configured to identify features of the type "through hole of diameter 0.25 in to 0.5 in" and apply a tolerance threshold of 0.001 inches for such features or may be configured such that the allowable error is a function of the distance between points or features. In some embodiments, the embodiments herein may be configured with an overall margin of error or tolerance threshold in addition to zero or more semantic- or scale-based tolerances.

In comparing features such as holes, thread pitch, surface finish, etc., an allowable error may comprise disregarding or allowing for the presence, non-presence, or differences in such features between the target 3D model and a possible match. For example, if the target 3D model is a mounting bracket comprising a 75 mm VESA mount hole pattern, it may be acceptable to disregard or give less weight to errors or differences relating to an otherwise equivalent mounting bracket comprising both 75 mm and 50 mm VESA mount hole patterns (as is typical in many such mounting systems).

In principle, a 3D model M and the model comprising M converted into another 3D model format, C(M), should be isomorphic (e.g., identical or identical within some tolerance). In practice, however, such conversions are imperfect and often result in imperceptible changes to geometry that can lead to problems with parts manufactured according to C(M).

On the other hand, M and C(M) may differ only in representation/encoding, mesh parameterization, triangulation density, etc. but are otherwise isomorphic (e.g., M and C(M) are different but equivalent representations of the same 3D object). Presently, assessing the fidelity of such conversions is typically a tedious manual process that is costly and subject to human error.

Accordingly, embodiments of the present application may assess or verify the fidelity of a 3D model after conversion from one format to another format. For example, these conversions may include or otherwise occur when importing a CAD model from another CAD package, or exporting a native CAD model into a neutral CAD format, such as STEP or STL.

In some embodiments, such isolated comparisons may be used to detect or characterize changes to a 3D model to measure the extent of any inequality between two files claiming to be the same 3D model. In other words, the described embodiments can assess dissimilarity or inequality between models and output human-readable explanations of the specific differences, if any. This change detection may identify or characterize instances in which models have been tampered with, corrupted, covertly or suspiciously modified, or otherwise changed by a malicious actor, saboteur, or adversary, or other matters relating to the security and cybersecurity of models.

Prior art methods or systems that use feature vectors to characterize similarity are capable of direct comparison between two models (e.g., by measuring the difference or "distance" between their respective feature vectors). If the applicable prior art feature vector algorithm produces the same output for each model, then it is likely, but not guaranteed, that the models are identical. However, if the feature vectors differ, it is impossible to identify what aspect(s) of the models resulted in the difference—or even where such difference exists.

The embodiments described herein provide novel techniques to not only identify, quantify, and classify features or models, but also to explain differences between models in vocabulary and semantics familiar to users. Even if properties of a target 3D model are unknown, the embodiments herein may leverage the ability to recognize features of a model for multiple purposes. In some embodiments, extracted features may be used to automatically label a model, and these labels may help train or test machine learning (ML) or artificial intelligence (AI) models. As used herein, the meaning of the term "data science" comprises the diverse set of statistical, scientific, computational, and heuristic methods, processes, models, and algorithms for extracting, extrapolating, or inferring knowledge, insight, or other information from data and the discipline concerned with the same. Data science is generally understood to comprise, in part, ML and AI while AI is generally understood to be a subset of ML. However, there is not general agreement on the dividing line between AI and ML, i.e., even experts in the art may disagree as to whether an ML technique or model is or is not AI. As such, the terms AI and ML, whether used individually or severally herein, shall be construed as synonymous unless expressly associated with specific algorithms or techniques.

Comparing 3D models according to specific, relevant features may enable more detailed, precise comparisons at lower computational cost compared to, e.g., computing graph isomorphism between models that may comprise tens or hundreds of thousands of vertices and edges. Graph isomorphism techniques may suffer from differences in how 3D modelling software discretizes or quantizes curves, triangulates or tessellates geometries, etc. The approach of breaking a large, difficult problem into smaller, tractable chunks or subproblems may be referred to as a "divide-and-conquer" strategy.

Additionally, a 3D model may comprise or be accompanied by metadata that describes the object represented by the model. Metadata may include, without limitation, textual descriptions of the object, part or SKU numbers, material specifications, relationship of the part to assemblies or kits of parts, engineering notes, versioning information, images or renderings, results of prior feature extraction analyses, etc. In some embodiments, the algorithms of the first stage, second stage, or both described below may consider metadata in addition to the 3D model proper. In some embodiments, such metadata-related properties of a 3D model may be treated as features during feature extraction and comparison procedures. In some embodiments, metadata may further comprise documents or files relating to a 3D model and, in some embodiments, such documents or files may comprise engineering notes or instructions, fabrication information, components of technical data packages, content managed by engineering data management (EDM) or product lifecycle management (PLM) or similar systems, or other information known to one of ordinary skill in the art to be associated with 3D models, CAD models, or engineering artifacts.

The metadata may also include economic data such as economic factors or metrics, costs, logistical, manufacturing capabilities, manufacturer availability, methods of fabrication or manufacture, materials availability, tooling requirements, inventory status, or other factors that may affect the cost, lead time, feasibility of manufacture or fabrication, acquisition, etc. of the real-world object represented or defined by a 3D model (collectively, "economic metadata").

Some embodiments may be configured such that if multiple putative matches are isomorphic to the target 3D model, they may be sorted or organized according to certain economic metadata. Some embodiments may be configured such that putative matches isomorphic to the target 3D model may be flagged or redacted according to economic metadata, such as if the corresponding real-world part is obsolete, has been recalled, or is otherwise unavailable.

FIG. 1 illustrates a system 100 for identifying similar three-dimensional (3D) representations of an object in accordance with one embodiment. A user device 102 may execute a user interface 104 accessible by user 106. The user device 102 may include an input/output (I/O) device such as, but not limited to, a laptop, PC, tablet, smartphone, smartwatch, or any other type of device that can execute the user interface 104 to allow the user 106 to provide and view parameters regarding models to accomplish the features of the embodiments herein.

The user interface 104 may allow a user to review classification determinations, putative matches, or both. The user interface 104 may also allow a user to provide feedback to the system 100. In some embodiments, user feedback may be used to refine or tune classification algorithms. In some embodiments, user feedback may be used to reclassify a target 3D model, such as based on additional metadata provided by the user. This metadata may be in the form of textual descriptions, parametric descriptions or specifications, or context data. Context data may comprise specification data of the respective object's role, location, or function or identification of the system, subsystem, functional area, or application. In some embodiments, context data may comprise information about the user, the user's role, location and attributes thereof, skill level, or permissions. In some embodiments, if the classification module 116 identifies multiple possible classifications for a target 3D model, user feedback may be employed to select the correct or most probable classification, to exclude incorrect or improbable classifications, or otherwise modify the classification according to user input. In some embodiments, certain metadata may be associated with or linked to a model, for example, labeling a subset of the model geometry as comprising a particular type of spline or thread form.

As described herein, a "user" such as the user 106 may refer to a person or machine/computer system making use of or interacting with the components of the disclosed embodiments. One of ordinary skill in the art will recognize based on context whether a "user" may be a human, a machine/computer system, or encompass either or both.

There may be multiple concurrent users of the system, such as a human user interacting with a user interface 104, and the business logic of the user device 102 communicating with other components of the system 100. Notions of explainability with respect to a model match or non-match herein are in reference to explaining a result or other item to a human. For example, something may be "explainable" only if it can be interpreted or understood by a human. In some embodiments, the human user may be an ordinary mechanical engineer, CAD engineer, or machinist or the human user may not be trained in computer science, data science, AI or ML, or computational geometry, topology, or other specialist branches of mathematics. In some embodiments, the explainability of a result or other item may be enhanced or made more efficient or convenient for the user by means of further processing by, without limitation, a presentation layer, user interface, translation from a machine-readable format to a human-readable format, or other rendering or display-related processing. In some embodiments, computer systems or algorithms may be configured to extract meaning from, e.g., a feature comparison tensor, and perform automated processing on the same.

However, this does not mean that the respective feature comparison tensor is explainable to a human.

The user device 102 may be in operable connectivity with one or more processors 108. The processor(s) 108 may be any hardware device capable of executing instructions stored on memory 110 to provide various components or modules to accomplish the features of the embodiments herein. The processor 108 may include a microprocessor, a field programmable gate array (FPGA), an application-specific integrated circuit (ASIC), graphics processing unit (GPU), or other similar devices.

In some embodiments, such as those relying on one or more ASICs, the functionality described as being provided in part via software may instead be configured into the design of the ASICs and, as such, the associated software may be omitted. The processor 108 may be configured as part of the user device 102 (e.g., a laptop) or located at some remote location.

The memory 110 may be L1, L2, L3 cache, or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may vary as long as instructions for analyzing models can be performed by the system 100. The system 100 may also include durable storage 111. Durable storage 111 may include, without limitation, disks, hard drives, SSD or other flash-based storage, removable media, magnetic or optical media, network-attached storage (NAS) or storage area networks (SAN), or cloud storage. For example, in some embodiments, the system 100 may read one or more models for analysis from durable storage 111.

The system 100 may also include an interface 112 to receive data from and communicate data across one or more networks 114. For example, the interface 112 may receive one or more models for analysis.

The processor 108 may execute or otherwise include various modules or components for analyzing 3D models. These may include, but are not limited to, a classification module 116, a feature identification module 118, a tensor generation module 120, and a comparison module 122.

The processor 108 may be in operable connectivity with one or more external devices 124 and 126 over one or more networks 114. The network(s) 114 may link the various components with various types of network connections. The network(s) 114 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34b is analog modem connection, a cable modem, an Asynchronous Transfer Mode (ATM) connection, a Fiber Distributed Data Interface (FDDI) connection, a Copper Distributed Data Interface (CDDI) connection, an optical/DWDM network, or another wired or fiber optic network, link, or communication method known to one of ordinary skill in the art.

The network or networks 114 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, an IEEE 802.11-based link, a satellite network or satellite communications link, free-space optical network or communications link, other radio frequency, optical network, or otherwise wireless or communications link or method known to one of ordinary skill in the art.

The devices 124 and 126 may refer to entities that may be interested in analyzing or having a model analyzed to find an isomorphic match or assess the degree of similarity between 3D models. For example, a user of device 124 or 126 may need to order parts for which they only have 3D model. Accordingly, this user may transmit a request for the processor 108 to identify a particular model, and provide a match thereto.

The processor 108 may be in communication with one or more databases 128 storing data regarding objects or models. For example, the database(s) 128 may store a corpus 130 of 3D models.

As described above, the disclosed embodiments may comprise a multi-stage process for identifying zero or more models from a corpus 130 of 3D models that are isomorphic to a target 3D model or isomorphic within some tolerance. A first stage of the process may involve the classification module 116 selecting one or more putative matches of models from the corpus 130 of models. In some embodiments, a tolerance, margin-of-error, or equivalent may comprise one or more scalar or higher-dimensional quantities, criteria, or assertions.

In some embodiments, the classification module 116 may execute a convolutional neural network 132 or other type of machine learning or deep learning procedures to identify objects from a large (e.g., potentially hundreds of thousands of models) that may be similar to a target 3D model. In some embodiments, the classification module 116 may comprise a classifier 134 or an ensemble of classifiers 134. This ensemble may include, for example, a first classifier that identifies a general classification of the target 3D model followed by a second classifier specialized to refine the classification of objects of the type identified by the first classifier. The disclosed embodiments may implement a multitude of ensemble designs and selection or classification methods. Some classifiers 134 may be configured to consider a model's previously-extracted feature(s) or may use feature extraction algorithms in such computations of classifications. In some embodiments, a 3D model's classification may comprise an ordered or unordered set of one or more labels and, in some embodiments, a 3D model may have or be assigned multiple classifications or multiple sets of labels. As used herein, the terms "label" and "classification" are synonymous. In some embodiments, some labels may be human-readable, e.g., words, measurements, or quantities.

The computational tractability of some embodiments may depend on the classification module's 116 ability to narrow down the corpus 130 of objects into a manageable size of putative matches. Otherwise, the corpus 130 may have a prohibitively large number of models such that a brute force search would be impractical or of prohibitive computational cost. Similarly, it may be nonsensical or otherwise unnecessary to apply certain feature extraction algorithms to certain models.

For example, it may not be prudent to apply a feature extraction algorithm for identifying a gear tooth feature on a model of an engine block. Furthermore, because the feature tensors herein may comprise higher-dimensional components (e.g., matrices, graphs, etc.), the cost in time or computation involved in identifying all features of models of a large corpus 130 may be prohibitive. The disclosed embodiments achieve a more complex, precise, and explainable comparison to be tractable by using the lower-precision classification module 116 to preselect or down-select both putative matches and applicable features.

The classification module 116 may identify or otherwise assign multiple classifications for an input which, in some embodiments, may be because a target 3D model may be cross-listed under multiple, distinct categories. In some embodiments, a target 3D model's classification(s) may be accompanied by or incorporate one or more confidence measures or other metrics relating to the likelihood that the target 3D model belongs to each respective classification. For example, objects such as parts or items in a catalog are often cross-listed under multiple categories such that they would be associated with multiple classifications. For some objects, their classification may be ambiguous, or the object may otherwise defy classification and may be listed in a category such as "miscellaneous", "other", or "none".

In some embodiments, the putative matches of a target 3D model may comprise all elements of the corpus 130 in the same classification(s) as the target 3D model. In some embodiments, the classification module 116 may be configured to filter or further narrow down putative matches according to attributes of or calculations on the target 3D model or the corpus 130. In some embodiments, the classification module 116 may return zero putative matches, for example, because no element of the corpus matches the target's classification. In such cases, in some embodiments, the system 100 may be configured to reclassify the target according to one or more alternative methods or algorithms, perform additional or more computationally-or time-intensive analysis, or generalize or weaken the target's calculated classification, for example, by ignoring one or more labels or attributes.

The classification module 116 may rank the putative matches according to one or more confidence measures or other metrics relating to the likelihood that each putative match is isomorphic to the target 3D model. In some embodiments, putative matches may comprise elements of the corpus 130 having different labels or classifications. In some embodiments, confidence measures may be non-scalar. In some embodiments, putative matches may not be ranked or may not be associated with confidence measures or other metrics. In some embodiments, comparison module 122 or comparator(s) 140, as discussed below, may or may not consider confidence measures or metrics.

As discussed previously, the algorithms or procedures of the first or second stage may consider metadata in addition to the 3D model proper. In some embodiments, such metadata-related properties of a 3D model may be treated as features during feature extraction and comparison. In some embodiments, metadata may further comprise documents or files relating to a 3D model and such documents or files may comprise engineering notes or instructions, fabrication information, components of technical data packages, content managed by engineering data management (EDM) or product lifecycle management (PLM) or similar systems, or other information known to one of ordinary skill in the art to be associated with 3D models, CAD models, or engineering artifacts.

The first stage or otherwise the classification module 116 may be omitted or may be configured to return the entire corpus 130—whether in general or for specific targets. For example, if the corpus 130 is relatively small, it may be more efficient to perform a brute force comparison of the target 3D model with all models of the corpus 130. In these instances, the first stage or otherwise the classification module 116 may be omitted or bypassed such that the comparator(s) 140, discussed below, may be used directly to compare a target to a specific model, such as in the case of assessing the fidelity of a 3D model conversion.

In like manner, in some embodiments, the classification module 116 may be configured to return a value with the semantic meaning of "all," meaning that all models of the corpus 130 or all models of a specific portion of the corpus 130 may be considered as putative matches. In some embodiments, the classification module 116 may be configured to return a value with the semantic meaning "none," indicating that the classification module 116 has determined that the target 3D model is not among the elements or models of the corpus 130 or a specific portion of the corpus 130.

A model's classification may define a partition function or equivalence class relationship over the corpus 130. In some embodiments, a model's classification may comprise multiple hierarchical components with each subsequent component adding specificity to the classification. For example, a particular nut may be classified as [hardware], [hardware, fastener], [hardware, fastener, metal], [hardware, fastener, metal, nut, hex, metric], etc. As previously discussed, in some embodiments, if a model's classification matches zero elements of the corpus 130, the classification module 116 may choose to generalize or make less specific the target's calculated classification which, in the present example, may comprise eliminating one or more of the calculated specifiers, such as "nut". In some embodiments, a model may be classified according to computations on the model itself, the model's metadata, or both.

For example, it may be known or believed that a target 3D model is part of the fuel system of a particular type of engine. This context data may be determined or inferred according to the user 106 or the user's location. For example, if the user 106 is a mechanic on a particular aircraft, the system 100 may infer that the search context comprises that particular aircraft and not, for example, a truck. A user's location may allow inference of context, such as if the user's location is a particular maintenance facility that only services a definite set of products.

In some embodiments, definite features of models of the corpus 130 may be known a priori, and in some instances a feature of a putative match may not have been among the features extracted during analysis of a target 3D model. In some embodiments, when comparing a target 3D model to a putative match wherein the putative match has a feature that was not extracted from the target 3D model, the associated feature extraction algorithm(s) may be invoked on the putative match during the comparison stage to extract or identify the respective feature. In some embodiments, the classification of the respective putative match may be updated according to such extraction or identification, which updating may comprise one or more of modifying corpus 130, notifying classification module 116, or writing data to memory 110 or durable storage 111. In some embodiments, such "just-in-time" or "lazy" feature extraction and classification refinement may be used to reduce the computational or temporal cost of adding elements to a corpus 130, possibly by omitting more complex feature identification algorithms 136, or, in some embodiments, to allow the system to defer execution of feature identification algorithms that may later be added to or configured in the feature identification module 118.

In some embodiments, the feature identification module 118 may execute an algorithm to search for a more specific embodiment of the respective feature or to locate such feature in a specific region of the 3D model. As an example, a gear feature may have been identified in a target 3D model, but the gear tooth form may not have been calculated or may have been ambiguous. In this case, when compared to a particular putative match, a feature identification algorithm may be configured to analyze the portion of the target 3D model comprising the gear and report a full characterization of the gear tooth form thereof.

The feature identification module 118 may execute a set of algorithms of the second stage according to the classification output of the first stage. For example, the first stage may indicate that the target 3D model likely belongs to one or more categories of objects. The second stage may be configured such that a specific set of algorithms is applied to a given category or classification of objects or objects with a specific label or labels. For example, in an embodiment where the first stage indicates that the target 3D model may be a gear, the feature identification module 118 may apply gear-specific algorithms—and thus extract gear-related features or possibly determine that the 3D model is not a gear.

The feature identification module 118 may execute one or more geometric feature extraction algorithms 136 to detect and characterize geometric features. Without limitation, geometric features may include dimensions, graph or subgraph isomorphism, curves or parametric curves, semantic features, mechanical features or attributes, such as the forms of gear teeth, machine tapers, or threads, hole patterns, bores or shafts, proportions, mathematical attributes or characteristics, e.g., from the fields of topology, computational geometry, linear algebra, etc., annotations pertaining to geometry, such as tolerances, curve radii, or thread specifications, heuristics, domain- or industry-specific features or aspects, or other aspects of features of a 3D models applicable in comparing or analyzing 3D models. In some embodiments, the set of features to be analyzed may be configured on a per-comparison basis, such as according to user input. These algorithms may be configured such that their outputs may be used to fully- or partially-classify models or to augment the output of the classification module 116 of the first stage.

The feature identification module 118 may execute one or more metadata analysis algorithms 138 for extracting or otherwise analyzing metadata associated with a model. This may include the types of metadata discussed previously. In some embodiments, some geometric feature extraction algorithms may take as input the outputs of one or more metadata analysis algorithms or may invoke one or more metadata analysis algorithms during execution. Some feature extraction or identification algorithms may expressly consider metadata and geometry, which algorithms can be understood as belonging to either or both of the sets of algorithms 136 and 138. The union of the set of algorithms of feature identification module 118 may be referred to herein as feature extraction algorithms.

The identified features may be represented as scalar quantities and, in some embodiments, features may be represented by vector or higher-dimensional objects or data structures, the contents of which may comprise a plurality of data types. In some embodiments, the identified feature's encoding or representation comprises semantic or express characterizations, specifications, or descriptions of the feature.

For example, an algorithm may be configured to identify a gear tooth and the resulting feature may comprise the gear form, diametrical pitch, radius, etc. In another example, an algorithm may be configured to identify hole patterns and the resulting feature may comprise the number of holes, their spacing or geometric relationship, hole depth(s), and hole diameter(s), or an indication denoting that a hole pattern is consistent with a specific standard or layout. In some embodiments, more abstract geometric features, such as Cauchy constants or topological measures, may be extracted from the target 3D model. In some embodiments, the target 3D model comprises metadata such as annotations, notes, version information, standards compliance information, materials specifications, heat treatment specifications, or other metadata that may be included in or be associated with a 3D model or that may be present in 3D CAD models or mechanical drawings.

In some embodiments, a property of "has feature X" or "does not have feature X" may be used as part of a model's classification. This use of features as Boolean values is fundamentally different than the analysis of the classification module 116 of the first stage, which determines whether an element of the corpus 130 is included or excluded from the second-stage comparison (e.g., because a candidate model does or does not have a feature identified in the target 3D model) whereas the feature identification module 118 identifies differences between the value of a feature of the target 3D model and that of a putative match.

The feature extraction algorithm(s) may be configured to analyze previously-extracted features to identify and characterize relationships between features. For example, the feature identification module 118 may execute an algorithm that identifies holes, an algorithm that identifies cylinders or discs, and an algorithm that identifies radially-distributed features. The identified features may be inputted into another algorithm configured to identify correspondences between holes and cylinders or discs, intersections between the same (e.g., a shaft through a disc), or possibly invoke other feature extraction algorithms according to identified relationships between features. This process may continue inductively or iteratively according to the model being analyzed or as per configuration.

In some embodiments, feature extraction algorithms may aggregate multiple features into a more specific or semantically-relevant feature. For example, the feature identification module 118 may consider such aggregate or higher-level features or such features may be used in explaining comparison results. In some embodiments, semantic inferences about features may also inform categorization or classification, e.g., when adding a 3D model to a corpus or, in some embodiments, as part of the first-stage classification itself.

A set of feature extraction algorithms may be configured according to the classification of the target 3D model or the putative matches. In some embodiments, the order of execution of such algorithms may be configured such that putative matches that are non-isomorphic to the target 3D model can be rejected early. That is, certain comparisons may be performed during feature extraction. Similarly, the classification module 116 or the feature identification module 118 may reject a putative match if a given feature comparison determines that the putative match cannot be isomorphic to the target or exceeds the acceptable error by some specified amount.

This early rejection of putative matches may reduce the computational and temporal cost of executing the feature identification module 118, tensor generation module 120, comparison module 122, etc., and may make comparisons against a large set of putative matches tractable or fast enough for user-interactive-scale latencies. These rejected putative matches may be omitted from a results list returned by the components of the processor 108 or downstream presentation-layer components.

A 3D model created in CAD software commonly may comprise an assembly of sub-models, and each sub-model itself is a 3D model. For example, a 3D model of a ball-point pen may comprise an assembly comprising the pen's barrel, an ink cartridge, a front insert that locates the writing tip, and a rear plug. Each of these components may be defined by a 3D model that is encoded as a sub-model within or accompanying the model of the pen assembly. The subassemblies or sub-models can be understood as labels or grouping functions over distinct subsets of the model's geometry, and one of ordinary skill in the art will recognize that the geometric analysis of a 3D model may or may not consider such labels or grouping functions.

In some embodiments, an algorithm may examine a 3D model as a whole (i.e., without regard to the fact that it may be an assembly). In some embodiments, an algorithm may use the assembly information of a 3D model and the model's subassemblies or sub-models or such information may itself be treated as a feature or set of features of the model. In some embodiments, the geometric analysis of a 3D model may comprise the recursive analysis of an assembly and the embedded sub-models therein. In some embodiments, an algorithm performing such recursive analysis may return a tree or directed graph of features.

The tensor generation module 120 may receive the features extracted by the feature identification module 118 (as well as other metadata) and marshal these features into a feature tensor. A feature tensor may refer to a set or list of features, some of which themselves comprise feature tensors or other multi-dimensional data structures. In some embodiments, the total or partial order of elements of a feature tensor may be determined by the feature identification module 118 or tensor generation module 120, and may be ordered by rules, heuristics, algorithms, geometry, or other factors. In some embodiments, a tensor generation module 120 may perform aggregation or deduplication of features or perform such other processing as may be required by or as may be helpful to the comparison module 122. In some embodiments, a tensor generation module 120 may collect the features of a target 3D model and features of all putative matches and construct the models' feature tensors in light of the totality of data available about the set of models under consideration. Additionally or alternatively, these operations may be performed by the feature identification module 118. For example, if the target 3D model has features {A, B, C, D} and a putative match has features {A, C, D}, where A, B, C, and D are types of features, a tensor generation module 120 may structure the target model's feature tensor as <<A, B, C, D>> and the putative match's feature tensor as <<A, $\emptyset$, C, D>>, where $\emptyset$ denotes "null" or "the empty set", i.e., that the feature B was not found or present in the respective putative match. In some embodiments, the function(s) of the tensor generation module 120 may be implemented within feature identification module 118 and such embodiments may therefore lack an architecturally-distinct tensor generation module 120. It is understood that this is an implementation choice and does not affect the overall function or capabilities of the system nor does novelty rely on this aspect of the present invention.

In some embodiments, the same features of each putative match are extracted, which set of features may further be the same as the set of features extracted from the target model. One or more features of each candidate model may be precomputed and stored and, in such embodiments, the features of the putative matches may be retrieved or loaded from storage. In some embodiments, some features may be extracted during execution of the components of the system 100, while other pre-computed features may be loaded from durable storage 111 or database(s) 128. Note that there is a distinction between storing or caching the fact that a given model has a given feature and storing or caching the value of said feature.

The absolute or relative location(s) of feature(s) may be included or encoded within the feature tensor. In some embodiments, the geometric or semantic relationship between identified features may be included or encoded within a feature tensor. For example, if three intermeshing gears are identified in a 3D model, the feature tensor may contain information identifying how the gears intermesh, the spacing between the gear centers, the effective gear ratio, or whether a gear is configured as an idler gear. In another example, if a pulley feature and a shaft are extracted and their geometries intersect (i.e., the pulley is driven by the shaft), this relationship may be included in the feature tensor. In some embodiments, such relationships may be deemed features unto themselves, e.g., "pulley of type X driven by shaft of type Y riding on bearings of type Z."

There may be no prescribed length for a feature tensor, and dimensions of the elements of a feature tensor may differ from each other or may contain elements of different data types. In some embodiments, at least one element of a feature tensor has definite semantic meaning or can otherwise be explained in definite terms to a human in the context of the definite 3D model from which the feature tensor was computed. A feature tensor may or may not be a proper "tensor" as the noun is understood in the fields of mathematics or physics, such as a vector of vectors or an n-dimensional matrix. In most embodiments, feature tensors are not instances of the mathematical object "tensor" as the object is understood by one of ordinary skill in the art.

One of ordinary skill in the art will recognize that existing art in the area of 3D object comparison may use "feature vectors." As discussed herein, a feature tensor is not a feature vector and feature tensors are not obvious generalizations of or extensions of feature vectors. In particular, an n-dimensional vector is a point in an n-dimensional space, where each dimension is scalar. Feature vectors are typically compared by calculating a distance function, the result of which represents the distance (a scalar quantity) between the respective vectors in the respective n-dimensional space. While such comparisons may be useful in characterizing the relative difference between two feature vectors, the distance provides no insight into how or why they differ.

Additionally, the content of a feature vector-particularly the content relating to the geometry of the object it describes, if any-is generally the opaque result of a mathematical or algorithmic calculation and may comprise hundreds or thousands of terms or dimensions. In general, the creator of a feature-vector-extraction algorithm may be able to attribute definite, real-world meaning to at most a few of the high-order terms of the output of his algorithm-if any. The "features" described by feature vectors in accordance with existing techniques have no definite or articulable relationship to the geometric or semantic features of a model. For example, a 3D model may comprise hundreds of thousands of vertices and edges and each vertex is represented by three floating-point numbers, i.e., its x, y, and z coordinates. A feature vector commonly has on the order of 1,000 elements, wherein each element a single floating-point number that is typically in the range [−1,1] or [0,1]. In these cases, there is not enough information in a feature vector for differences between feature vectors to be meaningful in the context of the attendant models and their geometries.

Some existing techniques may use multiple feature vectors that are calculated by different algorithms to compare 3D objects. These techniques may report a single similarity score, such as the average of the distances between the corresponding vectors, or it may report a list of similarity scores—akin, perhaps, to the three FICO ratings, which are computed by opaque algorithms considered by lenders. While an array of feature vectors may be an instance of the mathematical object called a "tensor", i.e., a higher-dimensional generalization of a vector, such array is not a "feature tensor" as described in the present disclosure. This is because, inter alia, neither the vectors themselves nor the distances reported in comparison thereof has any semantic or human-relatable meaning beyond "likelihood of similarity." Similarly, feature vectors are typically normalized or the underlying calculation is scale-invariant and in part because, due to normalization and the aforementioned scale-invariance, the values of feature vectors have no definite or comprehensible relationship to scale; normalization and scale-invariance are intrinsic to this general class of algorithms as they are understood in the present art. In the present discussion, "normalization" means one or both of (a) remapping the value of a variable (e.g., a dimension) to a standard range, such as [−1,1] or [0,1] or (b) dividing a vector by its length such the resulting normalized vector has unity length (length equal to one unit).

Examining the arithmetic difference between feature vectors (or arrays of feature vectors) in accordance with existing techniques may be of little value because the differences themselves have no explicable real-world meaning. It is not possible to relate elements of a feature vector, individually or severally, to the model's geometry.

With respect to the present embodiments, the differences between the corresponding elements of two feature tensors may have semantic or real-world meaning. Additionally, in some embodiments, the comparison module 122 may perform comparison functions on a subset of the extracted features, wherein such functions consider of the relationship between said features. Furthermore, as previously discussed, in some embodiments, extracted features may include information such as the features' locations in the input model. In some embodiments, the data types of the elements of a feature tensor—and the data types of the contents of said elements—are essentially arbitrary.

In view of the above, the meanings of "feature vector", as it is used in the art, and of "feature tensor", as it is defined and used in the present disclosure, are fundamentally different in terms of content, structure, function, meaning, and utility. Additionally, the problems addressed by the disclosed embodiments involve determining isomorphism-identity or equivalence in the mathematical sense—or isomorphism within a dimensional tolerance, not probabilistic "similarity", which is the general problem typically addressed in prior art.

The comparison module 122 may compare the feature tensor of the target 3D model with that of each putative match. In some embodiments, a comparator 140 may comprise calculation of one or more of L1 norm, L2 norm, Cartesian distance, Hamming distance, cosine similarity, or one or more other comparison operations, including those discussed below. In some embodiments, the comparison module 122 may apply multiple comparison functions, i.e., comparators 140.

A result of the comparison may be scalar, vector, or a higher-order result. In some embodiments the result of a comparison may be a tensor. In some embodiments, feature tensors are compared element-wise and a resulting "feature comparison tensor" is outputted. In some embodiments, a target's feature tensor contains features not present in the feature tensor of a putative match or vice-versa. In these cases, the feature comparison tensor may include information indicating such disparity. In some embodiments, such disparities may or may not be dispositive with respect to the determination of isomorphism.

The comparison module 122 may perform direct comparisons between the models themselves, regions or voxels thereof, or over subassemblies thereof. Due to prior knowledge of previously-extracted geometric and semantic features, correspondences between the same, and the properties of well-formed 3D objects, calculating graph isomorphism is approximately linear in the number of vertices and edges under consideration and therefore computationally-tractable, even for large models. One of ordinary skill in the art will recognize that generalized graph isomorphism is NP-hard in the strong sense (i.e., computationally intractable), and embodiments of the present application do not claim to solve generalized graph isomorphism.

The user interface 104 may provide an output of the comparison result to the user 106. The result may be sorted, filtered, merged or aggregated, redacted, or otherwise modified according to the system's configuration or user preferences. Redactions may be performed in some embodiments for reasons of information security or sensitivity, such as if an explanation of a difference would disclose to the user information the user is not cleared to see.

In some embodiments, the processor 108 or a downstream component may output a value or values indicating that an exact match for the target 3D model has been identified. In some embodiments, the processor 108 or a downstream component may calculate and present one or more confidence metrics or other measures for putative matches that are isomorphic within the specified error tolerance. In some embodiments, the processor 108 or a downstream component may when presenting the results of comparisons between the target 3D model and non-isomorphic putative matches, display or otherwise identify the feature or features of the target, the putative match, or both, that lead(s) to the determination of non-isomorphism. For example, a non-isomorphic putative match for a target 3D model of a gear may include the annotation, "Target shaft type: 25 mm shaft, 5 mm keyway; putative match shaft type: 25 mm shaft, keyed machine taper." Note the difference in explainability or comprehensibility between this example and the opaque similarity metric(s) of aforementioned prior art.

The comparison module 122 may perform comparisons recursively over an assembly of subassemblies. The comparison result(s) may likewise be organized according to the assembly's hierarchy, such as in a tree or a directed acyclic graph. In some embodiments, comparison functions are applied to groups of features and such grouping may be configured according to the target's classification. For example, if the feature tensor has four top-level elements, [A, B, C, D], one comparison function may be evaluated over A and B, another over A, B, and D, and another over all four elements. In some embodiments, the explicability of the comparison may be aided by such feature-groupwise comparisons.

In some embodiments, the comparison module 122 may use structural information to perform localized comparisons or identify common sub-components (e.g., by identifying that a target 3D model and a putative match share identical housings but differ in the fasteners used to assemble the housings). In some embodiments, such common sub-components or sub-models may be reported as features unto themselves. In some embodiments, the comparison module 122 may be configured to restrict its attention to one or more sub-assemblies or sub-models such that a user may search for models that comprise a common sub-assembly. In some embodiments, the feature identification module 118 may be configured to ignore certain sub-assemblies or sub-models.

If a target 3D model is identical to or within some specified tolerance of a putative match, the system 100 may report said putative match or matches and the result of the comparison(s). In some embodiments, higher-order comparison results are explainable such that they can readily be interpreted or understood by a user or another system. For example, a simplified comparison result may be prepared for a non-technical manager or the comparison result may be converted into a format supported by a particular computer system.

The content of feature comparison tensors may be highly-precise by comprising exact, vertex-by-vertex differences between models or subsets thereof. In some embodiments, a user may be able to request that the system 100 modify one of the input models to conform with the other with respect to a particular feature or identified difference or, for example, to produce script code or a macro to instruct a particular CAD package to effectuate such a change. In this manner, a user could, in principle, accept or reject changes to a 3D model in a manner analogous to processing tracked changes in a word processor. Some embodiments may implement this notion of a 3D "redline" or "diff" and may implement semantics similar to "accept change" or "reject change". Importantly, as taught herein, this capability is not necessarily dependent on the changes having been made through a particular PLM or EDM system (which may have its own change management) or even that the models be of the same CAD or model format.

In some embodiments, the second stage (i.e., starting with the feature identification) may be used in isolation to compare two specified 3D models, neither of which is an element of the corpus 130. In these embodiments the user 106 may select the one or more features to extract and analyze in such comparison.

In contrast, most prior art techniques only provide a scalar "confidence value." This provides no insight into the nature of differences between the target and a putative match.

In some embodiments, the comparison results of the present application are explainable because each element of the feature tensor relates to a specific semantic geometric or metadata feature and such features will typically be understood by users of the system 100. For example, if a target 3D model of a shaft differs from a putative match only with respect to the geometry of a keyway, this difference can easily be explained to the user, e.g., "the keyway of target is 5 mm longer than putative match X." Importantly, the user may or may not care about certain differences such as if those differences do not affect a particular application or because the user intends to modify the part. The availability to the user of a meaningful assessment of "close enough" or the facilitation of the user making such assessment is among the novelties of the present disclosure.

Similarly, the feature tensors and comparison results may be used by a software application to provide a visual explanation of the differences or similarities between the respective models and, in such embodiments, the semantic meaning of each feature (and associated comparison) may be incorporated into or accessible by interacting with such visualization. In some embodiments, such visualization comprises the 3D rendering, orbiting, view controls, and capabilities known to one of ordinary skill in the art in the context of user interfaces for the manipulation of 3D objects.

Figure 2:
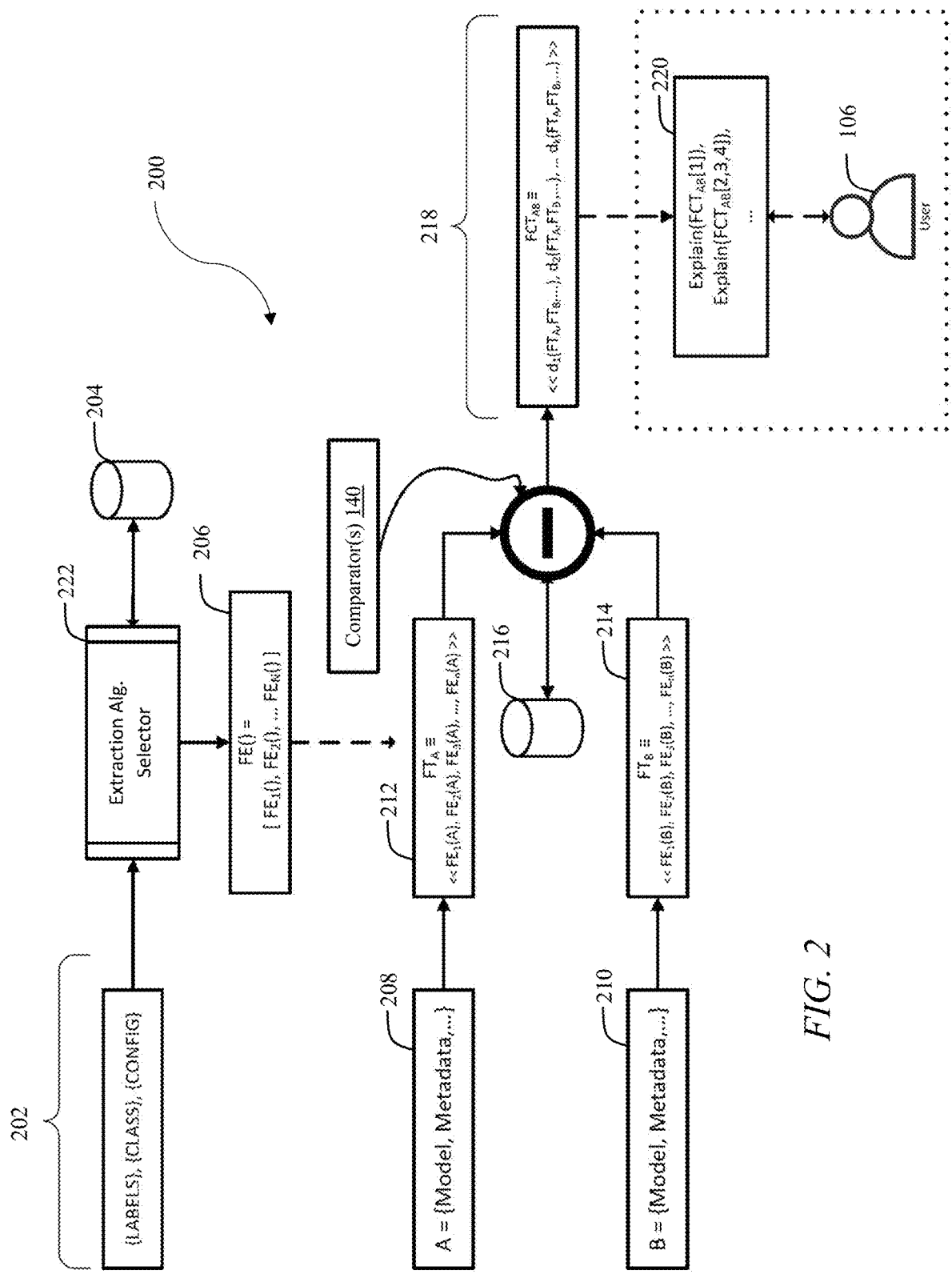
FIG. 2 presents a flowchart of a method for identifying similar three-dimensional (3D) representations of an object in accordance with one embodiment.

FIG. 2 depicts a flowchart of a method 200 for identifying similar three-dimensional (3D) representations of an object in accordance with one embodiment. A feature extraction algorithm selector 222 selects a set of feature extraction algorithms 206 according to inputs 202, wherein the inputs 202 may include the metadata of 3D model A 208 or 3D model B 210. The selector 222 may be configured as part of the feature identification module 118 of FIG. 1, may refer to database 204, inter alia, to fetch feature extraction algorithms, look up correspondences or associations between the labels or classifications of inputs 202 and feature extraction algorithms, or to look up prior or memorized results or data concerning one or both of model A 208 or model B 210.

The output of selector 222 comprises a list of feature extractors FE( ) 206. Inputs 208 and 210 comprise 3D models A and B, respectively, in addition to their respective metadata and possibly other information. As previously mentioned, these inputs may be available to selector 222 in some embodiments. Block 212 comprises the application of FE( ) 206 to model A, possibly in addition to other feature extraction algorithms invoked according to the values of one or more extracted features. The features extracted from model A 208 are marshalled into feature tensor $FT_A$. The length of $FT_A$ may be different from the number of feature extractors FE( ) in some embodiments. The feature tensor for model B 210 is computed and marshalled by block 214 in like manner to that of block 212, yielding $FT_B$. In some embodiments, blocks 212 and 214 may have access to inputs 202 or a subset thereof and, in some embodiments, may further have access to information calculated or fetched by selector 222. In some embodiments, the extractors $FE_1$( ), $FE_2$( ), . . . are executed in the same order by blocks 212 and 214 and so the first N elements of the resulting feature tensors will correspond to each other, as is shown in FIG. 2.

In some embodiments, blocks 212 and 214 may share information with each other during the course of their executions of FE( ). In some embodiments, such communication may enable execution to be aborted early, e.g., after determining that one or more features of one model are not present in the other. More generally, execution may be aborted if it is determined that the differences between models A 208 and B 210 are so large as to make isomorphism within the specified error tolerance impossible. In such cases, the subsequent behavior may depend on the application. In applications where method 200 is applied in the context of comparing a target 3D model to a plurality of putative matches, method 200 may simply return a value with the meaning "zero probability of match" or "not a match". In other applications, for example, when method 200 is being used "stand-alone" to compare two models (outside of a searching context, for example), it may be desirable to cease feature extraction but proceed with subsequent steps such that an explanation can be provided to the user.

$FT_A$ and $FT_B$ of blocks 212 and 214, respectively, and possibly in addition to other data or information received or calculated by previous steps or provided as input are passed to the comparison module 122, in which one or more comparators 140 will be executed. In some embodiments, the comparison module 122 will receive some inputs, such as the configuration information of inputs 202, directly. Comparators 140 may have access to database 216 in some embodiments. Database 216 may comprise or may otherwise facilitate access to some or all of the contents of database 204. Database 216 may comprise, inter alia, intermediate results or results of previous executions, libraries of comparison algorithms or feature extraction algorithms, configuration information, etc. The results of the execution of each comparator 140 on $FT_A$ and $FT_B$ are marshalled into feature comparison tensor $FCT_{AB}$ of output stage 218, and are denoted $d_1(\ )$, $d_2(\ )$, etc. In general, a comparator 140 has two inputs, corresponding to each of the feature tensors being compared. In some embodiments, a comparator 140 may have additional inputs, such as, without limitation, results from the execution of previous comparators, configuration, metadata or other information, the models proper, or the results of the execution of certain feature extraction algorithms.

A comparator 140 may in some embodiments, invoke feature extraction algorithms, for example, to refine the characterization or specificity of characterization of a particular feature or to perform an alternative analysis, e.g., because a feature was misidentified in previous calculations. These results may be passed on to subsequent comparators in some embodiments.

A comparator 140 may be configured to cease execution prior to having examined the contents of the feature tensors. In some embodiments, a comparator may return a result early if it definitively has determined that A and B cannot possibly be isomorphic within the given error tolerance. In some embodiments, a comparator 140 may be able to conclude isomorphism prior to evaluating all feature tensor content, for example, because the feature tensors contain redundant information or because, in analysis of prior features, the comparator 140 has examined the full extents of both models. In some embodiments, comparators may be configured to execute to completion (over the entirety of the feature tensors and other inputs), e.g., for completeness or because additional analysis may provide further refinement of the characterization of a feature or an error term.

The set of comparators 140 invoked for a particular comparison may vary depending on, for example, the set of features in question, configuration, user input, computational budget, or other performance or temporal concerns. In some embodiments, there may be a one-to-one relationship between the elements of FE( ) and each of $FT_A$ and $FT_B$. In such cases, a comparison may comprise pair-wise comparisons of the respective elements of the feature tensors; such comparisons may be reported verbatim as feature comparison tensors or may be processed by further comparison algorithms. In some instances, it may be the case that $d_i(FT_A,FT_B)$ is exactly $d_i(FE_i(A),FE_i(B))$ for $1 \leq i \leq N$. This may provide the user a detailed feature-by-feature comparison of A and B and this may be of particular value in some applications, such as tamper detection or assessing model format conversion fidelity.

The output of each comparator 140, i.e., $d_i(\ )$ may be of essentially arbitrary form or complexity—from a simple "equal/not equal" to complex data structures themselves potentially comprising feature comparison tensors or feature tensors. While some comparisons are explainable in isolation, other comparisons may be more meaningful when presented as a group. In general, in some embodiments, while a feature comparison tensor can be understood by a user 106, it may be better understood after being processed by a presentation layer 220, which comprises some form of user interface in which the one or more elements of the feature comparison tensor are displayed. While not shown in the figure, presentation layer 220 may have access to the models, metadata, inputs, or intermediate results of the computations of the feature comparison vector. In some embodiments, user 106 may be able to select a specific difference identified by the method or system, which difference will thence be displayed by presentation layer 220, for example, as annotations on renderings of models A and B or regions thereof.

In some embodiments, user 106 may via presentation layer 220 or other means, provide feedback based on comparison results. In some embodiments, such feedback may comprise the user identifying an error in the output, such as a misidentification of a feature. Such feedback may be used in some embodiments as feedback to machine learning or artificial intelligence algorithms. Such feedback may in some embodiments, be passed back into the input 202 (or a later stage), whereupon the comparison will be recomputed in light of the user's correction(s). In some embodiments, the user 106 may wish to ignore a portion of a model's geometry. This preference may be passed initially as an input 202 or, ex post, in the user's interaction with the presentation layer 220, which may result in reevaluation of the comparison in light of the user's feedback. In some embodiments, the system may not have required certain analysis to reach a comparison determination—for example, the feature extractors or comparators may not have required full characterization of a feature (such as identifying thread pitch or a standard hole pattern) to conclude isomorphism (or not). In such cases, the user may desire additional information about the part, which information may be determined through further analysis of the model(s) and, in some embodiments, the user may request the same, whether globally or with respect to selected feature(s). In other embodiments, the user may provide feedback of the form, "this feature is correctly identified", i.e., that the system's conclusion was correct. In these cases, some embodiments may choose to update labeling or metadata of the corresponding element(s) of the corpus 130 or "learn" that a particular feature is commonly found in a particular classification of object or in connection with certain other features.

Figure 3:
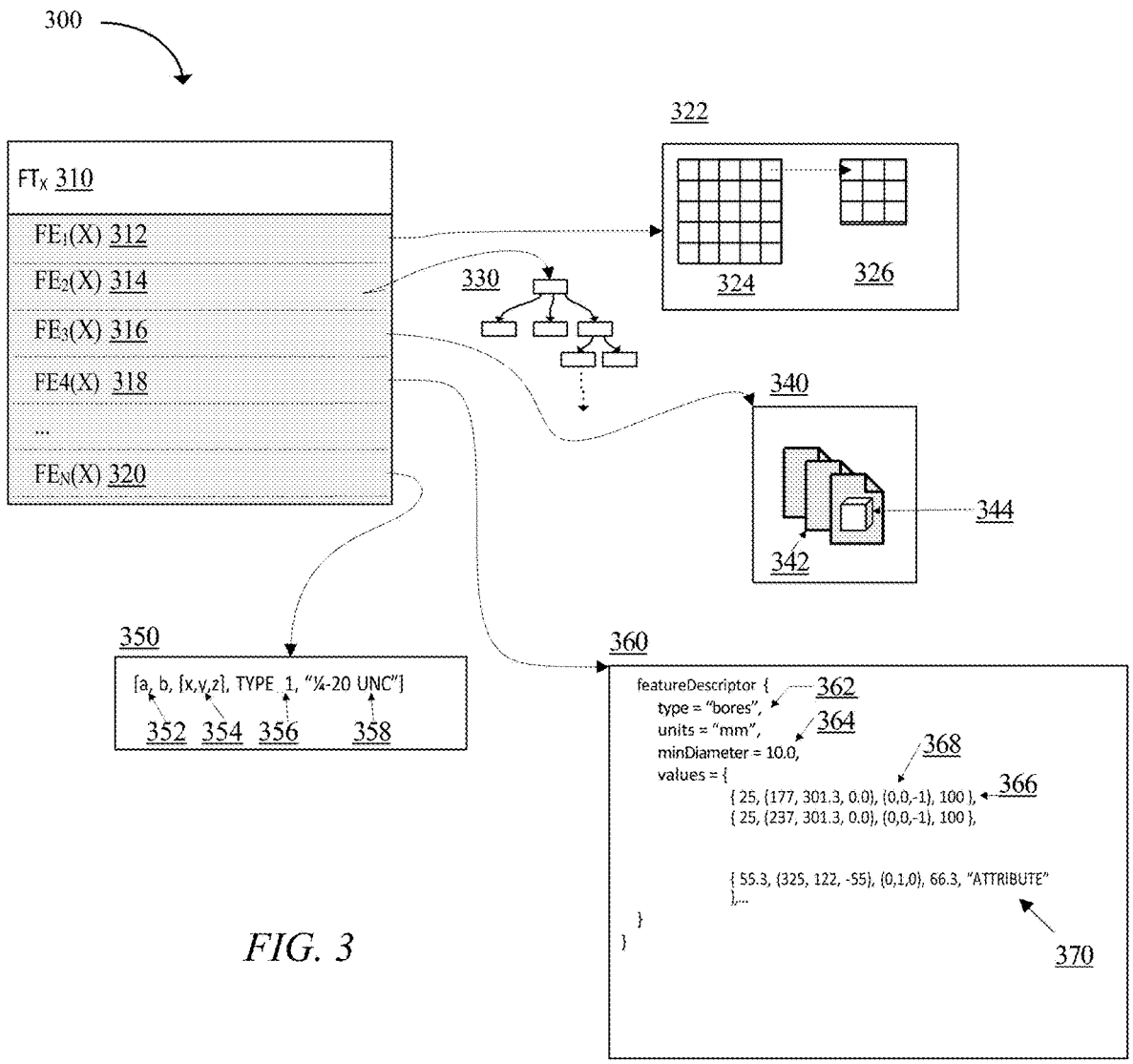
FIG. 3 illustrates a notional feature tensor in accordance with one embodiment.

FIG. 3 is an illustration of a notional feature tensor 300 in accordance with one embodiment. The feature tensor 300 may comprise a list or set of extracted features 310, $FT_x$ extracted from notional 3D model "X." Each of the extracted features 312, 314, 316, 318, and 320 in this example is the output of a feature extraction algorithm invoked on model X, i.e., $FE_1(X)$, $FE_2(X)$ . . . $FE_N(X)$. In the general case, the number of extracted features 310 will vary and may depend on, inter alia, model X itself, calculations performed by or output of a classifier, system configuration, or user inputs. As is illustrated in FIG. 3, feature tensor 300 may comprise a variety of data types, such as tabular structure 322, tree 330, document set 340, simple feature descriptor 350, and complex feature descriptor 360. An extracted feature $FE_i(X)$, (not shown in FIG. 3), may comprise scalar numeric values, numeric vectors, text or strings, or other data types or data structures. In some embodiments, an extracted feature $FE_j(X)$ may include references to one or more other extracted feature $FE_k(X)$. For example, the nodes of tree 330 may comprise references to extracted features represented in a tabular structure 320. In some embodiments, such cross-references may reduce the size of the representation of feature tensor 300 or make it less complex to analyze.

Extracted features may be represented in the form of tabular structure 322, comprising one or more tables 324 and zero or more other tables 326. Tables or rows of tables may reference other tables 326 or rows thereof, which tables 326 or rows thereof may further reference such additional tables or rows of the same. As described herein, a tabular structure is analogous to the data of a simplified relational database, with some references being "foreign key" relationships, for example. In some embodiments, a tabular structure 322 may comprise two or more independent tables (i.e., without references). In some embodiments, one or more columns of a table 324 may be labeled with a human-readable name or description, e.g., "LENGTH" or "X-COORDINATE". In some embodiments, the tabular structures 322 output by a particular feature extraction algorithm may follow a particular schema (not shown in FIG. 3), which schema may be well-known a priori to consumers of feature tensors.

Extracted features may be represented in the form of a tree 330 or otherwise a hierarchical data structure. A tree comprises a root node and zero or more child nodes, each of which may in turn have its own child nodes. Each node typically includes or references data. In some embodiments, tree 330 is generalized into a directed acyclic graph (DAG), which can be understood as a tree where a node may have more than one parent. As previously discussed, many 3D models are represented as assemblies of other 3D models; a tree or DAG is a natural choice of data structure to represent such hierarchical assemblages. In some embodiments, a tree (or DAG) 330 may encode or denote how a complex feature, such as a ball bearing, is extracted inductively from simpler geometric features. Such information enables a deeper structural comparison between models.

Extracted features may be represented in the form of a document set 340, which may comprise one or a plurality of documents or files 342. In some embodiments, a file 342 may contain (or be) a 3D model 344. For example, a model 344 may be a subset of the input model X's geometry or a subassembly. In some embodiments, a file 342 may include metadata extracted from a model and/or aggregated from other input metadata. In some embodiments, a file 342 may comprise data or an entire file, such as product documentation, which may have been supplied by an upstream component, such as a classifier, or which may comprise engineering notes that may be useful to the user but are not easily or accurately processed or interpreted by the system.

Extracted features may be represented as simple feature descriptors 350. A simple feature descriptor 350 is a loosely-structured list of parameters that describe or define a particular feature. For example, scalar- or string-valued parameters 352 may identify the type of feature or feature descriptor, tuple-valued parameters 354 may comprise the (x,y,z) coordinates of a feature, an enumeration-valued parameter 356 may contain one of a set of definite values of an enumeration, or string-valued parameter 358 may encode non-numeric or other more general information. The number, order, cardinality, and types of parameters of a simple feature descriptor 350 may vary from feature to feature or among variants of a given feature. Simple feature descriptors 350 have the advantage of being compact.

Extracted features may be represented as complex feature descriptors 360. A complex feature descriptor is a well-structured description of a feature or group of features, typically represented according to a schema or grammar. In some embodiments, the encoding of complex feature descriptors 360 may be configured to be both human- and machine-readable. A complex feature descriptor may contain, without limitation name-value pairs of type string 362, number 364, or a list or array 368, each element 366 of which may itself be a simple or complex feature descriptor or of similar form. Complex feature descriptor 360 may include information about what type of feature it describes (e.g., "bores" in descriptor 360)) or values relating to the configuration of the feature extractor (minimum diameter of 10.0 mm, in the present example). In the present example, the complex feature descriptor 360 comprises a list of features of type "bores", each element of which comprises heterogenous data comprising the bore diameter, starting position (coordinate), orientation (vector), length, and optional attribute 370.

The representation of the content of a feature comparison tensor (not shown in FIG. 3) is similar to that of a feature tensor and, a feature comparison tensor may contain the values of one or more extracted features to describe how two models differ with respect to a particular feature. The principal distinction, in some embodiments, is that a feature comparison tensor describes the differences between the features of two models as opposed to a feature tensor, which describes the features proper of one model. The underlying palette of data structures and semantics, however, is available to embodiments of both feature and feature comparison tensors.

Figure 4:
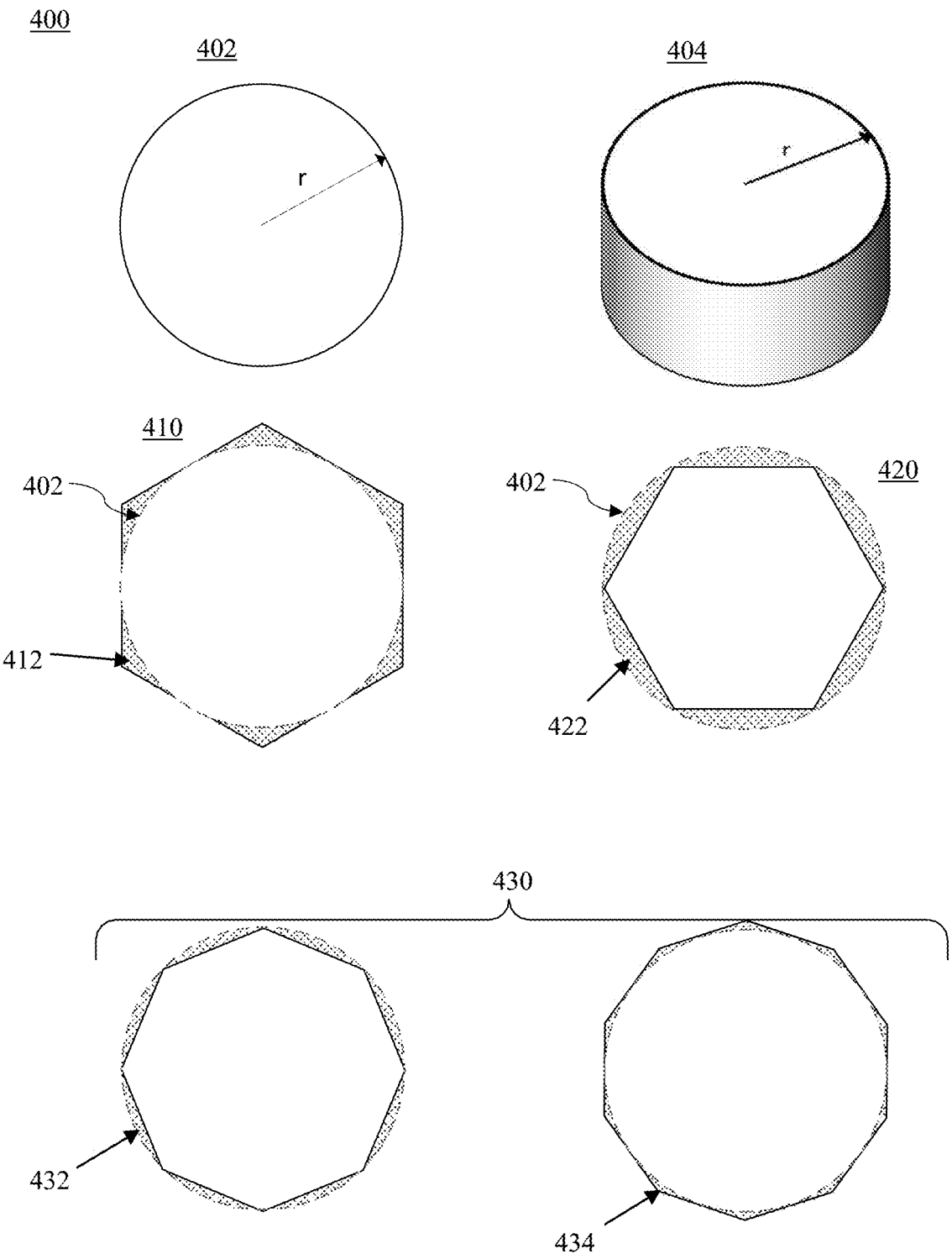
FIG. 4 illustrates a class of errors that can arise due to the discretization of curves.

FIG. 4 is an illustration of a class of errors in models or potential differences in models resulting from representing curves as piecewise-linear approximations of curves. This may inter alia, be a source of error in non-parametric representations, a benign cause of small differences among models of the same object, or a non-benign infidelity when converting between 3D model formats. Part 402 is a top-down projection view of a cylinder of radius r, and part 404 shows the cylinder in a perspective view. In both cases, the object is seen as circular. Many 3D model formats do not support parametric representations of curves. Although some may support simple circles or ellipsoids, a circular cross-section is sufficient for the present illustration. Instead, curves may be represented using a piecewise-linear approximation in which a curve is approximated by a sequence of straight lines. Images 410 and 420 depict hexagonal approximations of the circle of 402. In both cases, circle 402 is drawn with a dashed perimeter and the approximation is drawn with a solid perimeter. The difference between the circle 402 and the approximations is shaded and called out at 412 and 422.

The approximation of 410 circumscribes a hexagon around circle 402 whereas 420 inscribes a hexagon within circle 402. Both approximations lead to considerable error. However, in both cases, at least some of the points of the approximation are coincident with the circle. As the number of edges of the approximation is increased, as in the pair of illustrations 430, the approximation improves, i.e., the net or absolute error, 432 and 434, decreases. Likewise, the size of the model (number of vertices and edges) increases. Depending on the approximation method, the piecewise-linear approximation may result in dimensions that are larger or smaller than the original curve. For example, in 410, all points of the approximation are tangent to or outside of the circle 402. Considering a complex curve comprising both concave and convex regions, it is likely that different implementations will choose different approximation algorithms that will discretize the curve according to different rules and thereby introduce different errors.

A feature extractor or comparator as described herein may or may not know the "ideal" or intended geometry of a feature. For example, a comparator may or may not know the shape of circle 402 in the present example. Note that radii of circles and curves are often specified as metadata in 3D models and mechanical drawings, so the ideal geometry will be available in many cases. In other cases, it may be apparent that a feature must be, for example, circular, even though it is represented as an approximation. This is only possible, however, when the geometry is analyzed in context, i.e., feature-wise. Likewise, while a direct comparison between 432 and 434 may lead to a conclusion of non-isomorphism of the respective sets of vertices and edges, a feature-based comparison may identify that both are approximations of a circle of radius r and differ principally in piecewise-linear approximation methods or representations. When taken into account, this leads to a conclusion of isomorphism. Likewise, in comparing a model and a conversion of a model, an increase in the granularity of discretization of curves (i.e., using more edges) likely will be understood as an increase in fidelity while a reduction of granularity would be understood as a decrease in fidelity.

Although the present application largely discusses techniques for detecting model isomorphism, the features of the described embodiments may be implemented in a variety of applications. Cybersecurity relating to 3D models is of particular importance in industries such as defense, aerospace, transportation, nuclear power, medical devices, and other safety- or life-critical applications.

The features of the present application may be used to not only detect changes to a 3D model, but also to explain such changes to users such as personnel or systems monitoring cybersecurity. Additionally, the semantically-meaningful output as described herein may reduce false-positive rates of automated monitoring systems. For example, the embodiments herein may differentiate between a change to the spatial resolution of a piecewise-linear approximation of a curve and a change to the radius of the underlying curve, wherein the former is legitimate change that does not affect the integrity or function of the part while the latter may affect function. As another example, the embodiments herein may differentiate between a change to non-actionable metadata, such as the value of "last-saved-by-user" and a change to actionable metadata such as a tolerance, heat treating instruction, material specification, etc.

High false-positive rates in monitoring systems, such as those used in cybersecurity, may lead to the loss of efficacy of such systems because users may become overwhelmed with false-positives or choose to ignore signals entirely. Accordingly, the semantically-meaningful content of feature comparison vectors may be used to configure alerting or monitoring systems to filter out or ignore certain equivalence classes of changes in 3D models, such as granularity of curve discretization or changes large enough such that covert or malicious action is implausible.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A computer-implemented method for identifying similar three-dimensional (3D) representations of an object, the method comprising:
   receiving at an interface:
      a machine-readable target 3D model representing a target object, and
      at least one machine-readable candidate 3D model;
   executing at least one feature identification procedure to identify a feature of the target 3D model;
   generating a target feature tensor that includes data regarding the identified feature of the target 3D model;
   executing the at least one feature identification procedure on the candidate 3D model;

generating a candidate feature tensor that includes data regarding the identified feature of the candidate 3D model;
executing at least one comparison function to compare the target feature tensor and the candidate feature tensor;
generating a feature comparison tensor encoding data based on the execution of the at least one comparison function; and
identifying a degree of similarity between target 3D model and the candidate 3D model based on the feature comparison tensor.

2. The method of claim 1 wherein identifying the degree of similarity between the target feature tensor and the candidate feature tensor includes providing an explanation of a result of the comparison function.

3. The method of claim 1 wherein the comparison function comprises one or more of an L1 norm, L2 norm, Hamming distance, Cartesian distance, cosine similarity, graph isomorphism, or tensor-component-wise difference.

4. The method of claim 1 wherein the at least one feature identification procedure applied to the target 3D model is identified according to at least one feature identified in a candidate model or another property of the candidate model.

5. The method of claim 1 wherein at least one of the target 3D model and the candidate 3D model is associated with metadata including a textual description, technical data files, user inputs, a stock keeping unit (SKU), or material specification, wherein the metadata is provided as an input to at least one of the feature identification procedure or the at least one comparison function.

6. The method of claim 1 wherein at least one comparison function is configured to treat as identical at least one feature of the target 3D model if it differs from at least one feature of the candidate 3D model by at most a specified tolerance.

7. The method of claim 1 further comprising executing at least one classifier on the target 3D model to identify at least one classification of the target 3D model.

8. The method of claim 7 further comprising selecting the at least one candidate 3D model from a corpus of stored 3D models based on the selected candidate 3D model having at least one classification matching at least one classification of the target 3D model.

9. The method of claim 7 wherein the at least one classification is associated with at least one feature, and the at least one classification is determined according to the target 3D model having the at least one feature.

10. The method of claim 9 further comprising selecting the at least one feature identification procedure based on the classification.

11. A computer-implemented system for identifying similar three-dimensional (3D) representations of an object, the system comprising:
an interface for receiving:
a machine-readable target 3D model representing a target object, and
at least one machine-readable candidate 3D model; and
a processor executing instructions stored on memory and configured to:
execute at least one feature identification procedure to identify a feature of the target 3D model,
generate a target feature tensor that includes data regarding the identified feature of the target 3D model,
execute the at least one feature identification procedure on the candidate 3D model,
generate a candidate feature tensor that includes data regarding the identified feature of the candidate 3D model,
execute at least one comparison function to compare the target feature tensor and the candidate feature tensor;
generate a feature comparison tensor encoding data based on the execution of the at least one comparison function, and
identify a degree of similarity between target 3D model and the candidate 3D model based on the feature comparison tensor.

12. The system of claim 11 wherein the processor is further configured to provide an explanation of a result of the comparison function.

13. The system of claim 11 wherein the comparison function comprises one or more of L1 norm, L2 norm, Hamming distance, Cartesian distance, cosine similarity, graph isomorphism, or tensor-component-wise difference.

14. The system of claim 11 wherein the at least one feature identification procedure applied to the target 3D model is identified according to at least one feature identified in a candidate model or another property of the candidate model.

15. The system of claim 11 wherein at least one of the target 3D model and the candidate 3D model is associated with metadata including a textual description, technical data files, user inputs, a stock keeping unit (SKU), or material specification, wherein the metadata is provided as an input to at least one of the feature identification procedure or the at least one comparison function.

16. The system of claim 11 wherein the at least one comparison function is configured to treat as identical at least one feature of the target 3D model if it differs from at least one feature of the candidate 3D model by at most a specified tolerance.

17. The system of claim 11 wherein the processor is further configured to execute a classifier on the target 3D model to identify at least one classification of the target 3D model.

18. The system of claim 17 wherein the processor is further configured to select the at least one candidate 3D model from a corpus of stored 3D models based on the selected candidate 3D model having at least one classification matching at least one classification of the target 3D model.

19. The system of claim 18 wherein the at least one classification is associated with at least one feature, and the at least one classification is determined according to the target 3D model having the at least one feature.

20. The system of claim 19 wherein the processor is further configured to select the at least one feature identification procedure based on the classification.

21. A computer-implemented method for determining a difference between two 3D models, the method comprising:
receiving at an interface:
a machine-readable first 3D model representing a first object, and
a machine-readable second 3D model;
executing a first feature identification procedure to identify at least a first feature of the first 3D model;
generating a first feature tensor that includes data regarding at least the first feature of the first 3D model;
executing the first feature identification procedure to identify the at least the first feature of the second 3D model;

generating a second feature tensor that includes data regarding at least the first feature of the second 3D model;

executing at least one comparison function to compare the first feature tensor and the second feature tensor;

generating a feature comparison tensor encoding data based on the execution of the at least one comparison function; and identifying a difference between the first 3D model and the second 3D model based on the feature comparison tensor.

22. The method of claim 21 wherein at least one identified difference includes an explanation of the difference.

23. The method of claim 21 wherein the identified difference includes a reference to a location in at least one of the first 3D model and second 3D model where the identified difference is present.

24. The method of claim 21 wherein the at least one comparison function identifies that the identified difference is due to disparate discretization of curves or discretization of parametric curves.

25. The method of claim 21 wherein the second 3D model is generated by converting the first 3D model into a different format than the first 3D model, and the identified difference is used to assess at least fidelity or accuracy of the second 3D model compared to the first 3D model.

26. The method of claim 21 wherein the second 3D model is a putative copy or updated version of the first 3D model, and the identified difference is used to determine whether the first 3D model is isomorphic with the second 3D model or whether the identified difference is due to tampering, sabotage, file corruption, or an unauthorized or unanticipated modification of the first model.

27. The method of claim 21 wherein the comparison function treats as equal a portion of the first 3D model and the second 3D model that represent identical geometries or real-world objects but may differ in respective encodings, 3D model or mesh formats or implementations, triangulation or polygonization density or degree, curve parameterization, coordinate system, orientation, or certain metadata.

28. The method of claim 21 wherein the at least one feature identification procedure is selected based on at least one of user input; metadata of the first 3D model or the second 3D model; cached or persisted calculations from previous operations on the first 3D model or the second 3D model; or heuristics, documents, files, or technical data associated with the first 3D model or the second 3D model.

29. The method of claim 21 wherein the at least one comparison function comprises calculating graph isomorphism between the first 3D model and the second 3D model using at least one identified feature that is common to the first 3D model and the second 3D model.

30. The method of claim 21 wherein the method further includes receiving a user selection of at least one element of the feature comparison tensor indicating a difference between the first 3D model and the second 3D model, and modifying at least one of the first 3D model and the second 3D model to remedy the identified difference.

* * * * *